(12) United States Patent
Song (10) Patent No.: US 8,599,789 B2
(45) Date of Patent: Dec. 3, 2013

(54) TONE BASED COGNITIVE RADIO FOR OPPORTUNISTIC COMMUNICATIONS

(76) Inventor: Liang Song, Toronto (CA)

( * ) Notice: Subject to any disclaimer, the term of this patent is extended or adjusted under 35 U.S.C. 154(b) by 1210 days.

(21) Appl. No.: 12/155,421

(22) Filed: Jun. 4, 2008

(65) Prior Publication Data

US 2008/0311938 A1 Dec. 18, 2008

Related U.S. Application Data

(60) Provisional application No. 60/929,071, filed on Jun. 12, 2007.

(51) Int. Cl.
*H04W 4/00* (2009.01)

(52) U.S. Cl.
USPC .......................................... 370/331; 455/436

(58) Field of Classification Search
USPC ......... 370/346, 347, 348, 349, 331, 329, 330, 370/332; 455/436, 439, 442, 443, 450, 455/452.1
See application file for complete search history.

(56) References Cited

U.S. PATENT DOCUMENTS 5,697,066 A * 12/1997 Acampora .................... 455/466
2006/0274713 A1 * 12/2006 Pandey et al. ................. 370/346

* cited by examiner

*Primary Examiner* — Dady Chery
(74) *Attorney, Agent, or Firm* — Dale & Lessmann LLP (57) ABSTRACT

Within both the licensed and unlicensed wireless spectrum, benefits are obtained in allowing devices to form and communicate based upon opportunistic spectrum availability. At present such ad-hoc networks are established using either directly existing Media Access Control protocols or proposing modifications to them. According to the invention, there is provided a method for allowing abstract wireless links, i.e., arbitrary cooperation among a set of proximite wireless nodes, to be established between devices in a fast and efficient manner. Beneficially the approach allows multi-standard cognitive radios to operate in ad-hoc environments and non-ad-hoc environments. Accordingly a wireless module monitors a plurality of sensing tones and polling tones, each pair of sensing and polling tones associated with a transmission channel. A wireless module determines a vacant transmission channel by the absence of both a sensing tone and its associated polling tone. An abstract wireless link could be established by the wireless module transmitting the polling tone associated with the vacant transmission channel and detecting from second other wireless modules the sensing tone associated with the vacant transmission channel.

25 Claims, 6 Drawing Sheets

TONE BASED COGNITIVE RADIO FOR OPPORTUNISTIC COMMUNICATIONS

This application claims the benefit of U.S. Provisional Application No. 60/929,071 filed on Jun. 12, 2007, the entire content of which is incorporated herein by reference.

FIELD OF THE INVENTION

The invention relates to wireless communications, and more particularly opportunistic access of radio channels in wireless networks.

BACKGROUND OF THE INVENTION

The electromagnetic radio spectrum is a significant natural resource. In wireless communications, the transmitter modulates an analog/digital signal according to an allotted portion of the radio spectrum, so as to reach the receiver that can be listening to the signal on the same frequency band. Therefore, in order to control the mutual interference among uncoordinated wireless nodes, i.e. transmitters and receivers, the radio spectrum has traditionally been, and usually is, licensed by governments. However, in practice, such legacy command and control regulations introduce inefficiency into the spectrum resource allocation and its operation. Particularly, some licensed frequency bands are almost never used, or only partially used, whereas remaining frequency bands are heavily occupied. This results in a scarcity of radio spectrum resources for supporting the emerging commercial and/or scientific applications of wireless communications and networking, or fulfilling the demand for existing commercial and/or scientific applications.

For example, according to a recent measurement study of the United States Federal Communications Commission Spectrum Policy Task Force (Federal Communications Commission, "Spectrum Policy Task Force," Rep. ET Docket no. 02-135, November 2002.), the regulator's static spectrum allocation strategy has resulted in an inefficiency such that the temporal and geographical variations in the utilization of the assigned spectrum range from 15% to 85%. These observations, coupled with the service providers desire to reduce infrastructure costs, have led to the development and promotion of "cognitive radio". By definition, a cognitive radio can intelligently adjust the wireless communication parameters, in accordance with the ambient radio environment, such that the initiated wireless transmissions will not be interfering with other co-located radio spectrum usage. Further, the cognitive radio will dynamically adjust to the local radio environment, selecting and utilizing a channel based upon availability rather than a predetermined allocation. Therefore, instead of the legacy static spectrum allocation, regulators around the world are now encouraging the new paradigm of dynamic or opportunistic allocation, which can make much more efficient use of the radio spectrum resource and existing infrastructure.

Therefore, when the aforementioned "wireless communication parameters" are of a group of wireless data channels, the cognitive radio paradigm is specified to be "opportunistic wireless channel access". For one wireless node, it is further defined as the following: the wireless node can opportunistically access one wireless channel, selected from a group of predetermined channels, such that the selected one will not be interfering with other on-going wireless communications. By accessing the aforementioned wireless channel, the wireless node can opportunistically poll one or more other wireless nodes to the selected channel, so as to implement certain types of abstract wireless link communications.

In above, the "predetermined wireless channels" are usually differentiated by distinctive frequencies. It can also be differentiated by other means, such as spreading or autocorrelation signatures, as long as those distinctive channels are orthogonal to (i.e. not interfering with) each other. The "certain types of abstract wireless link" can be any functional abstractions of wireless links, such as broadcast, unicast, multicast/any-cast, or data aggregation, which can necessitate the mutual cooperation among a group of wireless nodes in proximity. A more detailed specification of the wireless link abstractions can be found in the work of Liang Song and Dimitrios Hatzinakos (see for example "Embedded Wireless Interconnect for Sensor Networks: Concept and Example," in Proc. IEEE Consumer Communications and Networking Conference, Las Vegas, Jan. 10-12, 2007, and "Cognitive Networks: Standardizing the Large Scale Wireless Systems," in Proc. IEEE 2nd Workshop on Cognitive Radio Networks, Las Vegas Nev., January 2008).

In principle, the operation of a cognitive radio, for opportunistic wireless channel access, is therefore composed of two steps. The first step is "sensing", where the first node determines one favored channel by evaluating the ambient radio spectrum environment; and the second step is "polling", where the first node polls a set of second wireless nodes in proximity to the identified channel. Both steps can follow an opportunistic criterion, where the favored channel and the set of second wireless nodes are determined opportunistically, i.e. based on the channel and the nodes availability.

It would be advantageous to provide a method and apparatus for cognitive radio that is able to quickly and effectively implement the aforementioned two steps of "sensing" and "polling". It would be further beneficial for the cognitive radio method to be compatible with existing wireless standards allowing the benefits to be leveraged in existing infrastructure deployments to provide enhanced utilization and improved quality of service. It would also be beneficial for the method of cognitive radio to operate with multiple wireless standards as commercial electronic devices increasingly support operation according to two or more wireless standards, for example laptop computers sold with integrated WiFi (IEEE 802.11) and Bluetooth (IEEE 802.15.1) transceivers. Additionally, the method should allow the formation, evolution and continued rearrangement of wireless networks.

SUMMARY OF THE INVENTION

In accordance with the invention there is provided a method comprising:
(a) providing a plurality of wireless modules; each wireless module of the plurality of wireless modules operating according to a wireless standard;
(b) initiating an arbitrary cooperation between at least two of the plurality of wireless modules in proximity, the arbitrary cooperation established in dependence upon at least one of a sensing tone and a polling tone, the at least one of the sensing tone and the polling tone being associated with a channel according to the wireless standard.

In accordance with another embodiment of the invention there is provided a method comprising:
(a) providing a plurality of transmission channels, each transmission channel comprising at least a data channel and at least one of a sensing tone and a polling tone, the at least one of the sensing tone and polling tone being associated with the data channel;

(b) establishing communication between at least two wireless modules operating according to a wireless standard upon one transmission channel of the plurality of transmission channels in dependence upon at least one of the sensing tone and the polling tone associated with the one transmission channel of the plurality of transmission channels.

In accordance with another embodiment of the invention there is provided a computer readable medium having stored therein data according to a predetermined computing device format, and upon execution of the data by a suitable computing device a method of establishing an arbitrary cooperation of a set of wireless modules in proximity is provided, comprising at least one of:

monitoring a plurality of sensing tones, each sensing tone associated with a transmission channel;

monitoring a plurality of polling tones, each polling tone associated with a transmission channel;

determining a vacant transmission channel, the vacant transmission channel being determined by an absence of at least one of its sensing tone, polling tone, and data transmission;

transmitting from a first wireless device the polling tone associated with the vacant transmission channel; and transmitting from a second other wireless device the sensing tone associated with the vacant transmission channel.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

Today typically users operating wireless devices interface to a wireless network that comprises a plurality of wireless hubs, base stations, interfaced to and interconnected by a wired infrastructure. The connections of wireless devices to these base stations are controlled by the Medium Access Control (MAC) data communication protocol sub-layer, also known as the Media Access Control, is a part of the data link layer specified in the seven-layer OSI model (specifically layer 2). MAC provides addressing and channel access control mechanisms that makes it possible for several terminals or network nodes to communicate within a multipoint network, typically a local area network (LAN) or metropolitan area network (MAN). Examples of medium access control that may be used in packet radio wireless networks are Carrier Sensing Multiple Access With Collision Avoidance (CSMA/CA), Time Devision Multiple Access (TDMA), Frequency Devision Multiple Access (FDMA), Code Division Multiple Access (CDMA) and Orthogonal Frequency Division Multiple Access (OFDMA).

In CSMA/CA, a station wishing to transmit has to first listen to the channel for a predetermined amount of time so as to check for any activity on the channel. If the channel is sensed "idle" then the station is permitted to transmit. If the channel is sensed as "busy" the station has to defer its transmission. This is the essence of the "collision avoidance" part of the protocol. CSMA/CA is used in 802.11 (Wi-Fi) based wireless LANs. One of the problems of wireless LANs is that it is not possible to listen while sending, therefore collision detection is not possible. Another reason is the hidden terminal problem, whereby a node A, in range of the receiver R, is not in range of the sender S, and therefore cannot know that S is transmitting to R.

CSMA/CA can optionally be supplemented by the exchange of a Request to Send (RTS) packet sent by the sender S, and a Clear to Send (CTS) packet sent by the intended receiver R, alerting all nodes within range of the sender, the receiver, or both, to keep quiet for the duration of the main packet. This is known as the IEEE 802.11 RTS/CTS exchange. However, such coordinated approaches do not transfer well to environments characterised by high mobility, significant flux in the type and quantity of users active at any instant, and the rapid establishment and removal of linkages between active members of the network, namely an ad-hoc wireless network. Such ad-hoc networks, being a self-configuring network of mobile routers and associated hosts connected by wireless links, forming an arbitrary topology, have garnered significant attention due to their ability to be rapidly established, suiting disaster or military environments, requiring no formal planning and significant infrastructure investments and fault-tolerance. With the routers free to move randomly and organise themselves arbitrarily, the network's wireless topology may change rapidly and unpredictably such that reconfiguration of the network is occurring in the timeframes of protocols such as CSMA/CA, TDMA, FDMA, CDMA, and OFDMA. Further such networks may operate in a standalone fashion, may be connected arbitarily together, or arbitarily connected to larger fixed networks or the Internet through any member of the network rather than dedicated portals, hubs, and base stations.

With such reconfiguration of the network topology being relatively new researchers have looked to adapting techniques from other fields, one of which is the use of pilot tones that have been exploited within electronics, wired communications and optical communications to provide signaling and control both inter- and intra-network element. For example Derrick Remedios et al (U.S. Pat. No. 7,139,486 "Method and Apparatus for Optical Add/Drop Multiplexing in Optical Networks") and Carrick et al (U.S. Pat. No. 7,016,607 "Methods and Apparatus for Optical Network Management using Pilot Tones") provide pilot tones on optical wavelength division multiplexed transmissions to provide low speed control and management of the signals without requiring determination of the wavelength of each signal within the optical fiber, and detection of the data stream, thereby allowing significant reductions in the complexity of node electronics.

Figure 1:
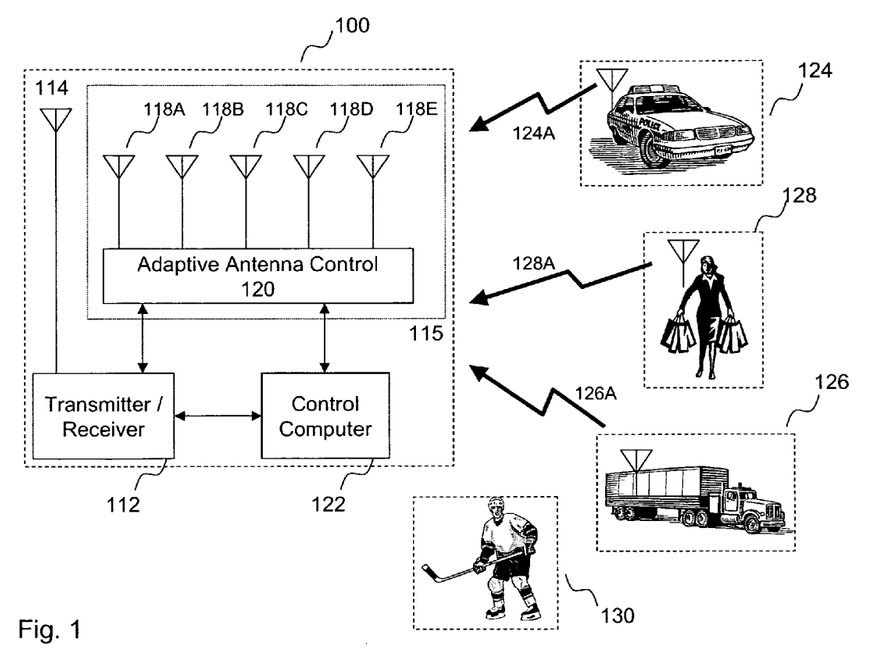
FIG. 1 illustrates a prior art approach to opportunistic wireless links using pilot tones in conjunction with an adaptive directional antenna.

Others, such as Posner (U.S. Pat. No. 6,556,076 "Feed Forward Amplifier with Amplifier Stage Failure Detection using Pilot Tones), Eisenberg et al (U.S. Pat. No. 6,452,446 "Closed Loop Active Cancellation Technique Based RF Power Amplifier Linearization Architecture"), and Roulston et al (U.S. Pat. No. 4,219,780 "Gain Controlled Amplifier Circuits") have exploited pilot tones for controlling individual elements of a network. Similarly, Acampora (U.S. Pat. No. 5,697,066 "Media Access Protocol for Packet Access within a Radio Cell") as shown in FIG. 1 exploits pilot tones from remote stations to provide information resulting in the reconfiguration of the base station 100. Therefore, the police vehicle 124 transmits a pilot tone 124A at the start of each data transfer period for which signaling will occur in each direction. The base station 100 receives this pilot tone 124A using the omni-directional antenna 114, the received signal being fed from the omni-directional antenna 114 to the transmitter/receiver 112 wherein it is processed and provided to the control computer 122. Accordingly the control computer provides signaling to the adaptive antenna control 120 which adjusts at least one of the amplitude and phase of the transmitter signals from the transmitter/receiver 112 provided to the array of antenna elements 118A through 118E. The adjustments configuring the base station 100 so that the adaptive antenna 115 is optimized for bidirectional transmission to the police vehicle 124 during that data transfer period.

At the end of the data transfer period truck 126 establishes its pilot tone signal 126A, which is received via the omni-directional antenna 114, as adaptive antenna 115 is currently "targeting" police vehicle 124, and when processed by the control computer 122 results in the signals provided to the antenna elements 118A through 118E being adjusted so that adaptive antenna 115 is "targeting" truck 126 for the next data transfer period. Similarly, in the next data transfer period lady shopping 128 issues a pilot tone 128A and the adaptive antenna 115 is "targeted" to her direction. In this manner, the adaptive antenna 115 provides enhanced performance during the operation of each of the mobile users 124 through 128. Within Acampora's system, the pilot tone signals 124A, 126A, and 128A are initiated by polling signals and polling acknowledgment signals.

However, Acampora's system still requires that the mobile users 124 through 128 are communicating with the base station 100 in a sequence that is determined from a MAC such as CSMA/CA, TDMA, FDMA, CDMA, and OFDMA. Otherwise, a new mobile user 130 will transmit overlapping with one of the existing users. As such, it is evident that whilst Acampora's system provides a method of increasing sensitivity and capacity the configuration of an ad-hoc network is not provided by the pilot tone approach presented for establishing the users by other than an existing standard protocol.

Figure 2A:
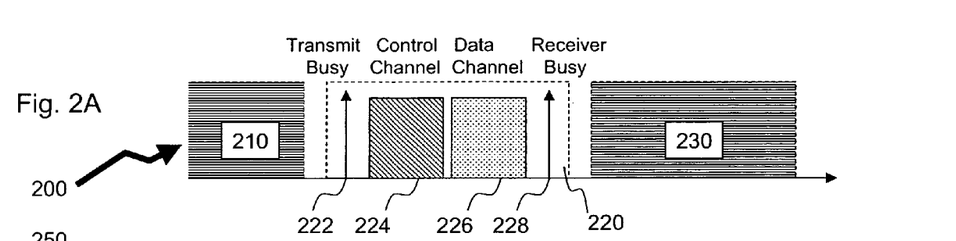
FIG. 2A illustrates a first aspect of a second prior art approach to opportunistic wireless links using pilot tones in conjunction with providing control and data channels within the normal single channel.
Figure 2B:
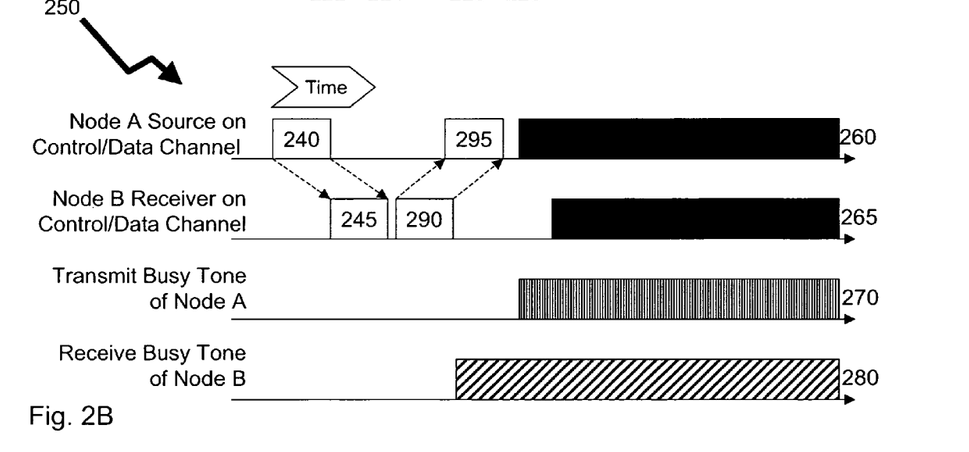
FIG. 2B illustrates a second aspect of the second prior art approach to opportunistic wireless links by denoting busy status of nodes after transmitting and receiving clear-to-send messaging via the pilot tones.

An alternative pilot tone approach addressing establishing a user within an ad-hoc network is presented in respect of FIGS. 2A and 2B. Referring to FIG. 2A a wireless spectrum 200 is shown according to the work of Z. J. Haas, and J. Deng, "Dual Busy Tone Multiple Access (DBTMA)—Multiple Access Control Scheme for Ad Hoc Networks," (IEEE Trans. on Communications, vol. 50, no. 6, June 2002) and "Dual Busy Tone Multiple Access (DBTMA)—A New Medium Access Control for Packet Radio Networks" (Proceedings IEEE ICUPC98, Oct. 5-9, 1998). Here three 802.11a channels 210 to 230 of the wireless spectrum 200, such as North America channels 36-64 of IEEE 802.11a between 5180 MHz and 5320 MHz are shown. Each of the 802.11a channels 210 through 230 is firstly split, so that second 802.11a channel 220 is split by time into control channel 224 and data channel 226. Additionally, the second 802.11a channel 220 contains transmit busy tone 222 and receive busy tone 228.

Now referring to FIG. 2B the timing diagram 250 for establishing an ad-hoc communication between a first node A, not shown for clarity, and second node B, also not shown for clarity, is shown. As such node A wishes to establish a transmission and sends an RTS 240 on a control channel, such as control channel 224. The RTS 240 is received by node B as RTS Query 245, which is able to receive. Accordingly node B transmits a CTS 290 and establishes it's receive busy tone signal 280, such as receive busy tone 228, thereby notifying all adjoining elements of the network that channel 220 is about to be used by node B to receive data.

The CTS 290 is received by node A as CTS OK 295, which initiates transmission of transmit data 260, on data channel 226, and is received by node B as received data 265. Node A also establishes it's transmit busy tone signal 270, using transmit busy tone 222 thereby notifying all adjoining elements of the network that node A is busy, and hence unavailable for receiving, and that channel 220 is in use.

Accordingly the Dual Busy Tone Multiple Access (DBTMA) overcomes some of the issues within RTS/CTS protocols that occur where transmission delays and propagation delays are long. Further, using tones for both forward and reverse communications directions has been shown by Haas and Deng to improve network utilization by nearly double that of the conventional RTS/CTS protocols, thereby enhancing the ability of an ad-hoc network to support a high user density and high traffic content. However, it is apparent that DBTMA is still dependent upon the RTS and CTS signaling between nodes and does not avoid collisions during such precursory activities.

Figure 3:
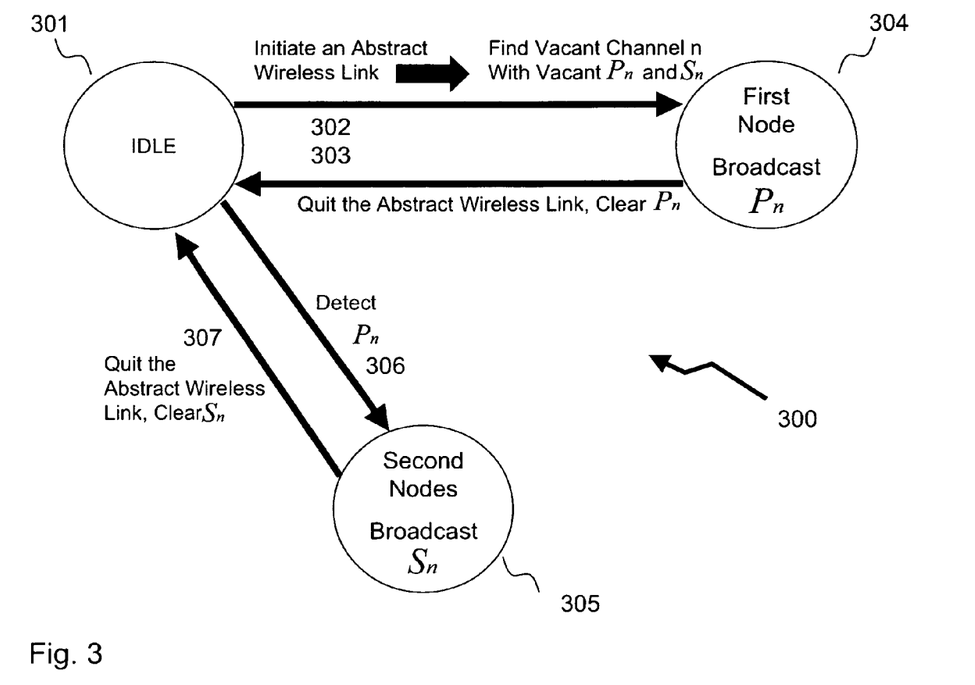
FIG. 3 illustrates an exemplary embodiment of the invention illustrating a state transferring diagram of the designed cognitive radio.

An exemplary state transfer diagram is shown in FIG. 3 for a tone based cognitive radio according to a first embodiment of the invention that overcomes the all the aforementioned issues. Accordingly, three states are illustrated, which are Idle 301, First Node 304, and Second Nodes 305. When a wireless device (radio) is not engaged in any abstract wireless link, it stays in the state Idle 301, and constantly or periodically monitors a set of polling frequency tones, denoted by $P_n$. When a node becomes the first node of an abstract wireless link, the radio is in the state First Node 304 and broadcasts the appropriate polling tone $P_n$, associated to the selected channel n. When the node becomes one of the second nodes of an abstract wireless link, the radio is in the state Second Nodes 305 and broadcasts the sensing tone $S_n$, associated with the selected channel n.

A radio transfers from Idle 301 to First Node 304, via branch 302, when the node of which the radio is part initiates an abstract wireless link. By doing so, the node opportunistically finds one vacant data channel n, with the vacant of tones $S_n$ and $P_n$. Such carrier sensing in this embodiment performed by energy detection on the channel n, where this is below a predetermined threshold $\xi_d$, whereas the energy detections on the associate frequency tones $S_n$ and $P_n$ are also below their predetermined thresholds $\xi_s$ and $\xi_p$, respectively. The parameters $\xi_d$, $\xi_s$ and $\xi_p$ alternatively having predetermined values determined in dependence of the transceiver noise figure, or optionally they can be adaptively updated by the radio firmware, from the sensing results of ambient noise.

When the node quits the current abstract wireless link, the radio transfers from its current state of First Node 304 to the state of Idle 301, via branch 303, where the radio stops broadcasting the polling tone $P_n$. If, however, the radio whilst in the state of Idle 301 detects a rising polling tone $P_n$ then the radio transfers from Idle 301 state to the Second Node 305 state, via branch 306. In this embodiment, this occurs when the energy detection on the tone $P_n$ jumps above a predetermined threshold $\zeta$. The parameter $\zeta$ can alternatively be determined in dependence of the transceiver noise figure, or adaptively updated by the radio firmware, from the sensing results of ambient noise. In Second Nodes 305 state the radio transmits the appropriate sensing tone $S_n$.

When the node quits the current abstract link as the second node then it transfers from the Second Nodes 305 state to the Idle 301 state, via branch 307, the radio stops broadcasting the sensing tone $S_n$.

Figure 4A:
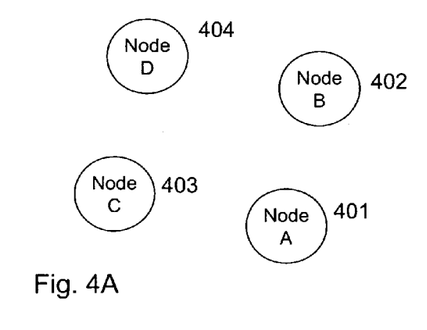
FIG. 4A illustrates a first exemplary snapshot of a network operating according to an embodiment of the invention, wherein all nodes are in the idle state.
Figure 4B:
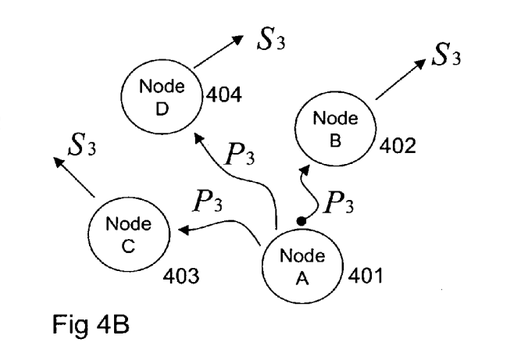
FIG. 4B illustrates a second exemplary snapshot of a network operating according to an embodiment of the invention, wherein sensing and polling activities are in progress with one node initiating an abstract wireless link.
Figure 4C:
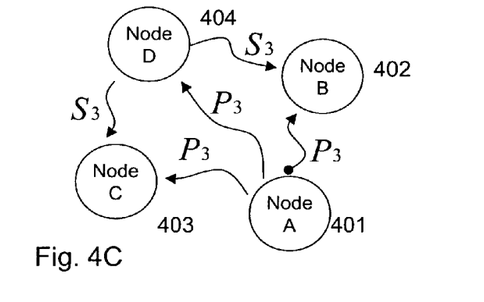
FIG. 4C illustrates a third exemplary snapshot of a network operating according to an embodiment of the invention, wherein two nodes quit the abstract wireless link.

Now referring to FIGS. 4A through 4C a series of snapshots of a four node network are shown as the ad-hoc association establishes an abstract wireless link according to an embodiment of the invention. Here each node executes a state machine according to that of the exemplary embodiment in FIG. 3. Within the context of the exemplary embodiment of FIGS. 4A through 4C, the number of channels is assumed to be 3. As shown in FIG. 4A the four nodes, Node A 401, Node B 402, Node C 403, and Node D 404 are all initially in an idle state, for example Idle 301 state. Referring to tables 1 through 4 below, the wireless channel and frequency tones status of each of the nodes is shown, these being Node A 401, Node B 402, Node C 403, and Node D 404 respectively. Within each table, the letter V indicates that the corresponding channel or frequency tones are vacant, e.g. the energy detection is under a corresponding threshold; the letter B indicates that the corresponding channel or frequency tones are busy, e.g. the energy detection is above a corresponding threshold; the letter T indicates that the node is transmitting on the corresponding channel or frequency tones; the letter U indicates that the node is either transmitting or receiving on the corresponding data channel.

In Table 1, it is shown that only the channel 3 can be used for initiating an abstract wireless link; as both the channels 1 & 2 have been occupied by some neighboring abstract wireless links, not shown for clarity. On channel 1, a neighboring node in state Second Nodes 305 of one neighboring abstract wireless link is in the range of Node A 401. On the channel 2, both a node in state First Node 303 and some second nodes of at least one neighboring abstract wireless link in the state Second Nodes 305 are in the range of Node A 401. In Table 2, both channels 1 & 3 can be used for initiating an abstract wireless link, but channel 2 has both a node in state First Node 303 and some second nodes of at least one neighboring abstract wireless link in the state Second Nodes 305 are in the range of Node B 402.

In Table 3, the same conditions appear for Node C 403 as exist for Node B 402. Finally, Table 4 depicts the status as seen by Node D 404, which is that both channels 1 & 3 can be used for initiating an abstract wireless link, but that channel 2 indicates the presence of a node in the state Second Nodes 305 for one neighboring abstract wireless link in range of Node D 404.

TABLE 1

Channel and Tone Status of Node A 401 in FIG. 4A

| | Index n | | |
|---|---|---|---|
| | 1 | 2 | 3 |
| Data Channel | V | B | V |
| Pn | V | B | V |
| Sn | B | B | V |

TABLE 2

Channel and Tone Status of Node B 402 in FIG. 4A

| | Index n | | |
|---|---|---|---|
| | 1 | 2 | 3 |
| Data Channel | V | B | V |
| Pn | V | B | V |
| Sn | V | B | V |

TABLE 3

Channel and Tone Status of Node C 403 in FIG. 4A

| | Index n | | |
|---|---|---|---|
| | 1 | 2 | 3 |
| Data Channel | V | B | V |
| Pn | V | B | V |
| Sn | V | B | V |

TABLE 4

Channel and Tone Status of Node D 404 in FIG. 4A

| | Index n | | |
|---|---|---|---|
| | 1 | 2 | 3 |
| Data Channel | V | V | V |
| Pn | V | V | V |
| Sn | V | B | V |

Based upon the channel status of Tables 1 through 4, and wishing to establish an abstract wireless link, Node A 401 moves via branch 302 into the state First Node 304, resulting in the snapshot of network activity shown in FIG. 4B. Node A 401 has found that channel 3 is vacant in both the data channel and the associate frequency tones $P_3$ and $S_3$ allowing the branch 302 process to be initiated. Thereafter, Node A 401 becomes the first node of the abstract wireless link, and broadcasts the polling tone $P_3$, which is detected by the other nodes, Node B 402, Node C 403, and Node D 404. Accordingly, Node B 402, Node C 403, and Node D 404 upon detecting polling tone P3 transition via branch 306 to the state of Second Nodes 305 and become the second nodes associated to the abstract wireless link, and broadcast the sensing tone $S_3$. Resulting status tables being shown below in tables 5 through 8 respectively.

Compared to the earlier snapshot Table 1, in Table 5 associated with Node A 401 shows that the status of $P_3$ becomes T, whereas the status of $S_3$ becomes B; and the status of the data channel 3 is U (i.e. either transmitting or receiving, depending on the specific abstract wireless link). Similarly, for Node B 402 comparing current snapshot status Table 6 with previous snapshot Table 2 we observe that the status of $P_3$ becomes B, whereas the status of $S_3$ becomes T; and the status of the data channel 3 is U (i.e. either transmitting or receiving, depending on the specific abstract wireless link). Similar status updates appear in Tables 7 and 8, which should be compared to the Tables 3 and 4, in respect of Node C 403 and Node D 404 respectively.

TABLE 5

Channel and Tone Status of
Node A 401 in FIG. 4B

| | Index n | | |
|---|---|---|---|
| | 1 | 2 | 3 |
| Data Channel | V | B | U |
| Pn | V | B | T |
| Sn | B | B | B |

TABLE 6

Channel and Tone Status of
Node B 402 in FIG. 4B

| | Index n | | |
|---|---|---|---|
| | 1 | 2 | 3 |
| Data Channel | V | B | U |
| Pn | V | B | B |
| Sn | V | B | T |

TABLE 7

Channel and Tone Status of
Node C 403 in FIG. 4B

| | Index n | | |
|---|---|---|---|
| | 1 | 2 | 3 |
| Data Channel | V | B | U |
| Pn | V | B | B |
| Sn | V | B | T |

TABLE 8

Channel and Tone Status of
Node D 404 in FIG. 4B

| | Index n | | |
|---|---|---|---|
| | 1 | 2 | 3 |
| Data Channel | V | V | U |
| Pn | V | V | B |
| Sn | V | B | T |

TABLE 9

Channel and Tone Status
of Node A 401 in FIG. 4C

| | Index n | | |
|---|---|---|---|
| | 1 | 2 | 3 |
| Data Channel | V | B | U |
| Pn | V | B | T |
| Sn | B | B | B |

TABLE 11

Channel and Tone Status
of Node C 403 in FIG. 4C

| | Index n | | |
|---|---|---|---|
| | 1 | 2 | 3 |
| Data Channel | V | B | U |
| Pn | V | B | B |
| Sn | V | B | B |

TABLE 10

Channel and Tone Status of
Node B 402 in FIG. 4C

| | Index n | | |
|---|---|---|---|
| | 1 | 2 | 3 |
| Data Channel | V | B | U |
| Pn | V | B | B |
| Sn | V | B | B |

TABLE 12

Channel and Tone Status of
Node D 404 in FIG. 4C

| | Index n | | |
|---|---|---|---|
| | 1 | 2 | 3 |
| Data Channel | V | V | U |
| Pn | V | V | B |
| Sn | V | B | T |

Now referring to FIG. 4C, the scenario illustrated is a subsequent snapshot where node B 402 and Node C 403 have quit the abstract wireless link, following the snapshot of FIG. 4B. As therefore shown in FIG. 4C Node B 402 and Node C 403 have stopped broadcasting the sensing tone $S_3$, and return to the Idle 301 state. Tables 9 through 12 now show the status of the four nodes, Node A 401, Node B 402, Node C 403, and Node D 404 at the snapshot of FIG. 4C. Accordingly in Tables 10 and 11, relating to Node B 402 and Node C 403 respectively the status of both $P_3$ and $S_3$ is B, because both Node B 402 and Node C 403 can detect the tones $P_3$ and $S_3$, which are being broadcast from Node A 401 and Node D 404, respectively. The status of the data channel 3 is still U, because both nodes are in the range of the abstract wireless link composed of Node A 401 and Node D 404.

As described in the exemplary embodiments of the invention supra in respect of FIG. 3 and FIGS. 4A through 4C there is described use of a set of distinctive frequency tones in coordinating wireless data channels, thereby implementing two important steps of opportunistic wireless channel access, namely "sensing" with sensing tones $S_n$ and "polling" with polling tones $P_n$. It would be apparent that alternate embodiments of the coordinating tones and wireless data channels are possible in respect of wireless module implementation and frequency assignments.

Figure 5A:
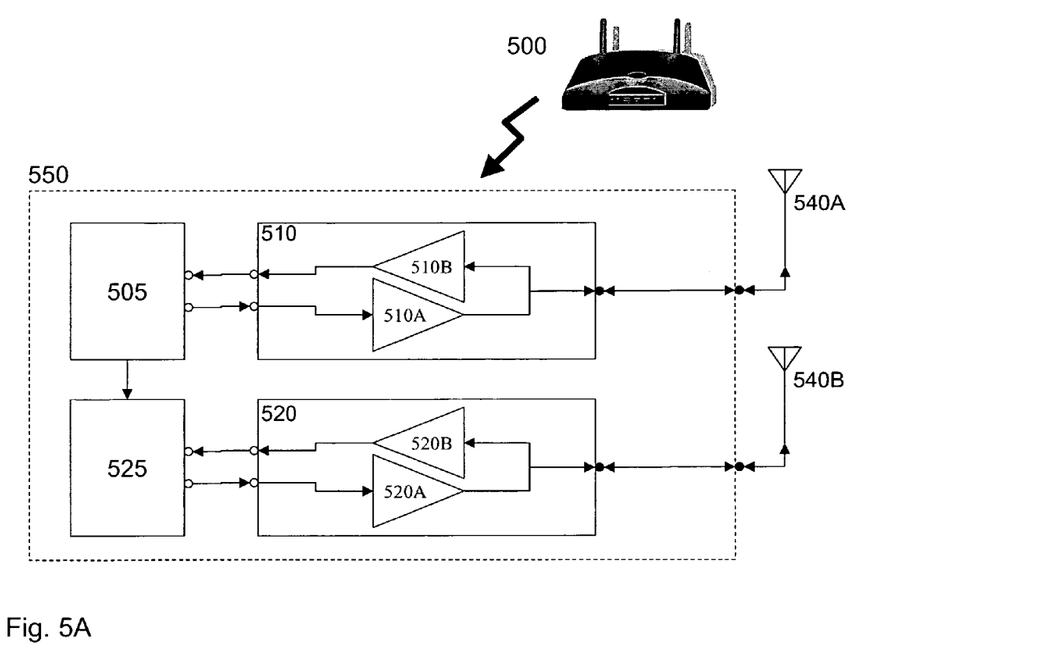
FIG. 5A illustrates a first exemplary construction of a wireless module according to the invention.
Figure 5B:
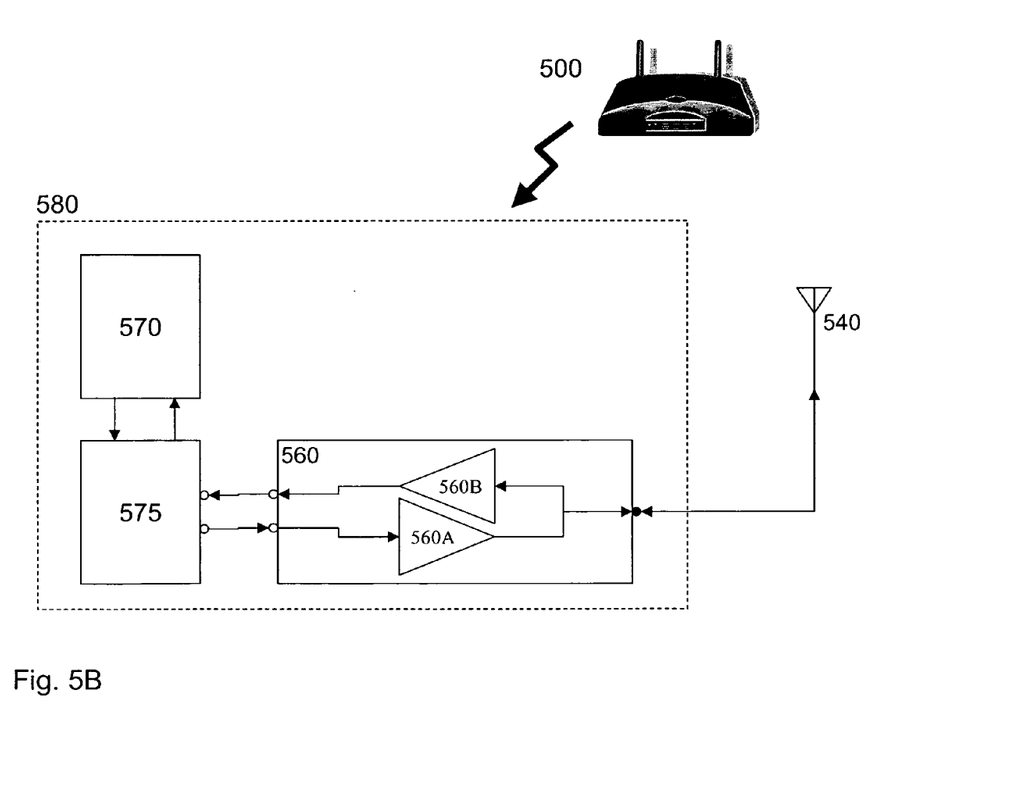
FIG. 5B illustrates a second exemplary construction of a wireless module according to the invention.

In FIGS. 5A and 5B, two exemplary embodiments of the invention are presented. Accordingly in FIG. 5A, a wireless node 500 contains a wireless module 550 providing wireless communications to a wireless network, not shown for clarity. Wireless node 500 may support a single wireless standard, such as WiFi (IEEE 802.11) with a single wireless module 550, or it may contain multiple wireless modules 550 wherein each operates upon different wireless standards such as WiFi (IEEE 802.11), WiMAX (IEEE 802.16), Bluetooth, or GSM.

As shown the wireless module 550 is interfaced externally to antennae 540A and 540B. The first antenna 540A is electrically connected to tone transceiver 510 and the second antenna 540B is electrically connected to the wireless standard transceiver 520. In this exemplary embodiment the sensing and polling tones are provided within a different frequency range to that of the wireless standard transceiver 520 operating according to the WiFi standard IEEE 802.11b/g. Wireless standard transceiver 520 comprising transmitter path 520A and receiver path 520B that interconnect to the wireless standard signal generator 525. As such the path from wireless standard signal generator 525 to antenna 540B is similar to conventional wireless modules operating by the physical or physical/MAC layer specifications of WiFi.

The tone transceiver 510 comprises tone transmitter path 510A and tone receiver path 510B, both of which are electrically connected to the tone controller 505. In this exemplary embodiment the sensing tone and polling tone frequencies have been assigned to the 902 MHz-928 MHz band of the Industrial, Scientific and Medical band (ISM as defined by ITU 5.138, 5.150, and 5.280) applicable to ITU Region 2 (Americas). As such these sensing and polling tones are at significantly different frequencies to the channel frequencies to which they relate, being 2.4 GHz-2.5 GHz for IEEE 802.11b.

Accordingly, in the exemplary embodiment of FIG. 5A, the wireless node 500 provides for the establishment of opportunistic wireless communications according to the invention with sensing and polling tones $S_n$ and $P_n$ within a different frequency band to those of the bidirectional data transmissions. As such the tone transceiver 510 operates within a different frequency range to that of the wireless standard transceiver 520. It would be apparent that the separate elements may be provided as a single wireless module 550 at initial point of manufacture or that the tone controller 505 and tone transceiver 510 may be a separate module optionally added to the wireless module 550 when the wireless node 500 is intended to provide opportunistic wireless communications such as within a café, airport, urban environment, etc. Whilst tone transceiver 510 and wireless standard transceiver 520 are shown interfaced to different antennae, first and second antenna 540A and 540B respectively, an alternative embodiment may be provided wherein each of the tone transceiver 510 and wireless standard transceiver 520 are electrically interconnected via a diplexer to a single common antenna.

Now referring to FIG. 5B an integrated wireless module 580 forming part of a wireless node 500 is shown where implementations of the tone based cognitive radio according to the invention are for high volumes of manufacture providing appropriate cost benefits or the sensing and polling tones may be handled by the same transmit—receive electronics as the actual data channel then a single integrated wireless module 580 may be provided. As such the antenna 540 is now coupled directly to the transceiver 560, receives and provides signals to the wireless controller 575. Tone controller 570 is therefore in communication with the wireless controller 575 to enable the transmitter and receiver paths, 560A and 560B respectively, to provide sensing tones and/or polling tones, $S_n$ and $P_n$ respectively. It would also be evident that the integrated wireless module 580 may be similarly replicated within the wireless node 500 to provide support for multiple wireless standards, such as co-located WiFi and WiMAX devices within a laptop computer, GSM and WiMAX within a PDA, etc.

It should therefore be apparent to the reader that, for every wireless data channel n, two distinctive frequency tones could be assigned to the channel n, i.e. the polling tone and sensing tone, which are denoted by $P_n$ and $S_n$ respectively. For different wireless channels, different frequencies of the tones are assigned, i.e. $P_n$ and $S_n$ could be uniquely distinctive, and are determined by the index n. Transmission of these defined tones will also not be interfering with the wireless data channels, via predetermined assignments.

Within the embodiments presented supra the sensing and polling tones have been described in the context of being CW waves on a single frequency point, which can be detected at a receiver, e.g. by filtering and energy detection. Alternatively, one or other of the tones may be a continuous signal centered at a single frequency point with a finite width, or may be a continuously repeating digital string that is indicative of the channel n and does not contain any digital information content other than relating to an identity of a node within the wireless network or the wireless module. Optionally, the codes may vary according to the wireless standard. The sensing and polling tones can be within a similar portion of the radio spectrum to the data channels where the sensing tones $S_n$ and polling tones $P_n$ may be provided as pairs spaced apart relative to a central frequency, such as the center frequency of the channel denoted by n, and may be on one or both sides of the data channel.

Alternatively, the sensing and polling tones may be within a different portion of the radio spectrum where existing channel guard bands, filter designs, etc., may preclude providing the sensing and polling tones to one, or both sides of the data channel as outlined supra. The different portion of the radio spectrum may for example be determined by the local jurisdiction, for example being between 5.120 GHz and 5.124 GHz in Japan so as to slot between the lower Japanese IEEE 802.11a band of 4.880 GHz-5.120 GHz and the upper Japanese IEEE 802.11a band of 5.142 GHz-5.258 GHz. Alternatively, they may be provided above 5.258 GHz in this Japanese jurisdiction scenario. Similar regions of spectrum exist within the European and North American jurisdictions for IEEE 802.11a. Alternatively, the sensing and polling tones may not be closely located with either the data channels or each other. Optionally, each may be a comb of frequencies, wherein the first comb of sensing tones $S_n$ is in one frequency range, and the second comb of polling tones $P_n$ is in another frequency range. Such alternate arrangements may suit the different requirements of network establishment in different jurisdictions.

Within the following description the establishment of an abstract wireless link is described with references to FIGS. 3A through 5B presented supra. Initially, a wireless node establishing itself within an opportunistic environment or completing a transmission is within an idle state, i.e. not engaged in any active abstract wireless links. As a result the cognitive radio within the wireless node is monitoring the predetermined set of polling tones $P_n$, within this description the wireless node electronics allowing continuous monitoring of all the tones. In one embodiment, determined by different criteria, including but not limited to network latency, network utilization, electronics architecture and cost, the cognitive radio may sequentially scan all the polling tones, or yet in another embodiment, the radio may monitor all the polling tones in one step, i.e. by a filter bank.

When a wireless node wishes to initiate an abstract wireless link, it becomes the first wireless node and enters the "sensing" step. The abstract wireless link as described in respect of the instant invention relates to certain types of mutual cooperation among a set of wireless nodes within an associated proximity or relationship. The mutual cooperation is executed via a wireless data channel, and includes but is not limited to broadcast, uni-cast, multicast, any-cast, and data aggregation. The implementation of these abstract wireless links may be according to a variety of physical or physical/MAC layer standards, such as those included in but not limited to IEEE 802.3, IEEE 802.11, IEEE 802.15, IEEE 802.16, IEEE 802.20, UMTS, GSM 850, GSM 900, GSM 1800, GSM 1900, GPRS, and IMT-2000, which relate to regulated wireless spectrum, or may be associated with non-regulated wireless spectrum including but not limited to the Industrial, Scientific and Medical Devices (ISM) covered by ITU-R 5.138, ITU-R 5.150, and ITU-R 5.280.

The opportunistic sensing result, i.e. the selected channel n, is found by determining that both the data channel n and its associated frequency tones, $P_n$ and $S_n$ are vacant. For example, "vacant" suggests that the energy detection on the channel or the frequency tones are below some predetermined threshold or thresholds, which is known as carrier sensing in wireless communications. In other embodiments, the sensing thresholds can be adaptively updated according to the ambient environments, environmental aspects including but not limited to receiver noise, network jurisdiction, frequency range being sensed, the mode of the electronic device containing the cognitive radio, network latency, and battery status of the electronic device containing the cognitive radio.

When "polling", the radio of a wireless node enters the state First Node 303 and transmits the polling tone $P_n$ associated with the selected channel n. The set of second wireless nodes are opportunistically decided, being those in the idle state, such as Idle 301, and detecting the "rising" of the tone $P_n$. As such "rising" being the transition of the monitored power for that frequency from below to above the predetermined threshold between two measurements. Again, this threshold may be adaptively updated according to ambient environments. The second wireless nodes thereupon listen to the associated wireless data channel n. At the same time, they also transmit the associated sensing tone $S_n$. The first wireless node may also determine that there is at least one available second node, based upon the first wireless node detecting the "rising" of the appropriate $S_n$ frequency transmitted from the second wireless nodes.

Thereafter, an abstract wireless link is established among the first node and the set of second nodes, allowing for arbitrary inter-node cooperation according to the particular wireless module design. One second node can quit the abstract wireless link, i.e., going back to idle state, by clearing the sensing tone $S_n$. The first node can also quit the abstract wireless link, i.e., going back to idle state, by clearing the polling tone $P_n$. The abstract wireless link is terminated when all the nodes quit the cooperation.

In addition, if multiple wireless modules are installed in a single wireless node, these wireless modules can operate according to the same or different wireless standards. And optionally the wireless modules can also operate simultaneously and independently within a wireless node, where each wireless module can be deemed as a co-located sub-node to the wireless node.

Numerous other embodiments may be envisaged without departing from the spirit or scope of the invention.

What is claimed is:

1. A method comprising:
   (a) providing a plurality of wireless modules, each wireless module of the plurality of wireless modules operating according to a wireless standard and being capable of operating on any one channel of a plurality of predetermined channels, each channel of the plurality of predetermined channels including a data channel and at least one signalling channel associated with the data channel;
   (b) at a first wireless module of the plurality of wireless modules, determining activity states of all channels of the plurality of predetermined channels, activity state of each channel of the plurality of predetermined channels including activity state of the data channel and activity state of the at least one signalling channel of the each channel;
   (c) at the first wireless module, opportunistically selecting a particular channel from the plurality of predetermined channels at least in dependence upon activity state of the selected particular channel; and
   (d) the first wireless module initiating communication with a second other wireless module of the plurality of modules, the communication being established over the data channel of the selected particular channel.

2. A method according to claim 1 wherein providing the plurality of wireless modules operating according to a wireless standard comprises providing wireless modules capable of signalling over each of the at least one signalling channel.

3. A method according to claim 1 wherein providing a wireless module according to the wireless standard comprises providing a wireless module operating according to at least the frequency plan of at least one of IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000.

4. A method according to claim 1 wherein step (a) comprises providing wireless modules capable of at least one of monitoring and transmitting over each of the at least one signalling channel.

5. A method according to claim 1 wherein step (a) comprises providing for each wireless module of the plurality of wireless modules a wireless circuit in electrical communications with the wireless module, the wireless circuit capable of at least one of monitoring and transmitting over each of the at least one signalling channel, wherein the wireless circuit provides at least signaling information to the wireless module identifying the data channel of the selected particular channel the wireless module should be operating on.

6. A method according to claim 1 wherein step (a) comprises providing electronic modules supporting operation according to a media access control protocol of the wireless standard under first predetermined conditions and according to steps (b)-(d) under second predetermined conditions.

7. A method according to claim 1 wherein step (c) comprises:
   determining a vacant channel from the plurality of predetermined channels whose data channel and associated at least one signalling channel are vacant; and
   selecting the vacant channel as the selected particular channel, and wherein step (d) initiating communication comprises:
   transmitting from the first wireless module a polling tone over a first signalling channel of the at least one signalling channel associated with the data channel of the selected particular channel;
   detecting a sensing tone transmitted from the second other wireless module over a second other signalling channel of the at least one signalling channel associated with the data channel of the selected particular channel, the sensing tone being transmitted from the second other wireless module upon the polling tone being detected at the second other wireless module on the first signalling channel.

8. A method according to claim 1 wherein step (d) initiating communication comprises establishing at least one of a unicast link, a multicast link, a broadcast link, an any-cast link, a unidirectional communication, and a bidirectional transmission between the first wireless module and the second other wireless module.

9. A method according to claim 7 wherein at least one of the sensing tone and the polling tone is an unmodulated signal, a CW frequency, a digital sequence, and a digital sequence containing information relating only to an identity of a channel of the wireless standard.

10. A method according to claim 7 further comprising:
  (e) maintaining transmission of the polling tone and the sensing tone for at least the duration of exchanging one data packet between the first wireless module and the second wireless module.

11. A method according to claim 10 further comprising:
  (f) terminating transmission of the polling tone upon completing an exchange of the data packet; and
  (g) terminating transmission of the sensing tone upon completing the exchange of the data packet.

12. A method according to claim 1 wherein data channel of each channel of the plurality of predetermined channels is provided according to at least one of Orthogonal Frequency-Division Multiple Access (OFDMA), Coded Orthogonal Frequency-Division Multiple Access, Code Division Multiple Access (CDMA), Time Division Multiplexing (TDM), Frequency Division Multiple Access (FDMA), Frequency-Hopping Spread Spectrum (FHSS), and Direct-Sequence Spread Spectrum (DSSS).

13. A method of establishing communication between at least two wireless modules, the method comprising:
  (a) providing a plurality of transmission channels, each transmission channel comprising at least a data channel and at least one of a sensing tone and a polling tone, the at least one of the sensing tone and the polling tone being associated with the data channel;
  (b) opportunistically selecting one transmission channel, at one wireless module of the at least two wireless modules, from the plurality of transmission channels in dependence upon a determination, at the one wireless module, of activity states of the at least one of the sensing tone and the polling tone associated with the one transmission channel of the plurality of transmission channels; and
  (c) establishing communication between the at least two wireless modules operating according to a wireless standard upon the one transmission channel of the plurality of transmission channels.

14. A method according to claim 13 wherein providing at least two wireless modules operating according to a wireless standard comprises providing wireless modules capable of operating on the data channel and the at least one of the sensing tone and the polling tone of any transmission channel of the plurality of transmission channels.

15. A method according to claim 13 wherein providing a plurality of transmission channels comprises providing a data channel of each of the plurality of transmission channels according to at least one of IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000.

16. A method according to claim 13 wherein step (c) comprises providing wireless modules capable of at least one of monitoring and transmitting at least one of a sensing tone of a plurality of predetermined sensing tones and a polling tone of a plurality of predetermined polling tones, each sensing tone of the plurality of sensing tones and each polling tone of the plurality of polling tones being associated with the one transmission channel according to the wireless standard, and transmitting data on the data channel of the one transmission channel.

17. A method according to claim 13 wherein step (c) comprises providing for each wireless module of the at least two wireless modules a wireless circuit in electrical communications with the wireless module, the wireless circuit capable of at least one of monitoring and transmitting at least one of a sensing tone of a plurality of predetermined sensing tones and a polling tone of a plurality of predetermined polling tones, each sensing tone of the plurality of sensing tones and each polling tone of the plurality of polling tones being associated with the one transmission channel according to the wireless standard and wherein the wireless circuit provides at least signaling information to the wireless module identifying the one transmission channel the wireless module should be operating on.

18. A method according to claim 13 wherein step (b) comprises:
  monitoring a predetermined subset of the data channels and the at least one of the sensing tone and the polling tone associated with the subset of the data channels at a first wireless module of the at least two wireless modules;
  determining a vacant transmission channel, the vacant transmission channel being determined in dependence upon an absence of its associated sensing tone, its associated polling tone and data transmission on its associated data channel; and
  selecting the vacant transmission channel as the one transmission channel at the first wireless module, and
wherein step (c) comprises:
  transmitting from the first wireless module of the at least two wireless modules the polling tone associated with the one transmission channel;
  detecting at the first wireless module the sensing tone associated with the one transmission channel transmitted from a second other wireless module of the at least two wireless modules, the sensing tone being transmitted from the second other wireless module upon detection of the polling tone at the second other wireless module.

19. A method according to claim 13 wherein step (c) establishing communications comprises establishing at least one of a unicast, a multicast, a broadcast, an any-cast, a unidirectional communication, and a bidirectional communication between the at least two wireless modules.

20. A method according to claim 13 wherein at least one of the sensing tone and the polling tone is an unmodulated signal, a CW frequency, a digital sequence, and a digital sequence containing information relating only to an identity of a data channel.

21. A method according to claim 13 wherein establishing communications comprises at least one of establishing communication to a different subset of wireless modules from a transmitting wireless module for each predetermined portion of data to be transmitted by the transmitting wireless module and establishing communication on a different transmission channel for each predetermined portion of data to be transmitted by a transmitting wireless module.

22. A method according to claim 13 further comprising:
  (d) at least one of:
    maintaining transmission of the polling tone and the sensing tone during communications between the at least two wireless modules, terminating transmission of the polling tone and the sensing tone after transmitting a predetermined portion of data from a transmitting wireless module of the at least two wireless modules, and terminating transmission of the polling tone and the sensing tone after a predetermined period of time.

23. A method according to claim 13 wherein the data channel of the one transmission channel provides communication according to at least one of Orthogonal Frequency-Division Multiple Access (OFDMA), Coded Orthogonal Frequency-Division Multiple Access, Code Division Multiple Access (CDMA), Time Division Multiplexing (TDM), Frequency Division Multiple Access (FDMA), Frequency-Hopping Spread Spectrum (FHSS), and Direct-Sequence Spread Spectrum (DSSS).

24. A method according to claim 13 further comprising: providing the at least two wireless modules supporting operation according to the wireless standard under first predetermined conditions and according to steps (b) and (c) under second predetermined conditions.

25. A non-transitory computer readable medium having stored therein data according to a predetermined computing device format, and upon execution of the data by a suitable computing device a method of establishing communication between a first wireless module and a second wireless module is provided, the method comprising:

monitoring at the first wireless module a plurality of sensing tones, each sensing tone being associated with a transmission channel of a plurality of transmission channels;

monitoring at the first wireless module a plurality of polling tones, each polling tone being associated with a transmission channel of the plurality of transmission channels;

determining a vacant transmission channel, the vacant transmission channel being determined by an absence of its associated sensing tone, its associated polling tone, and data transmission on its associated data channel;

opportunistically selecting at the first wireless module the vacant transmission channel for communication;

transmitting from the first wireless module the polling tone associated with the vacant transmission channel; and transmitting from the second other wireless module the sensing tone associated with the vacant transmission channel.

* * * * *